US010825016B2

(12) United States Patent
Raja

(10) Patent No.: US 10,825,016 B2
(45) Date of Patent: Nov. 3, 2020

(54) ELECTRONIC BEARER BOND ONLINE TRANSACTION AND CARD SYSTEM AND METHOD THEREOF

(71) Applicant: Ahsan I. Raja, Carmel, IN (US)

(72) Inventor: Ahsan I. Raja, Carmel, IN (US)

( * ) Notice: Subject to any disclaimer, the term of this patent is extended or adjusted under 35 U.S.C. 154(b) by 0 days.

(21) Appl. No.: 13/758,433

(22) Filed: Feb. 4, 2013

(65) Prior Publication Data
US 2013/0151406 A1   Jun. 13, 2013

Related U.S. Application Data

(63) Continuation of application No. 12/246,967, filed on Oct. 7, 2008, now Pat. No. 8,447,658, which is a continuation of application No. 09/910,756, filed on Jul. 24, 2001, now Pat. No. 7,447,661.

(60) Provisional application No. 60/220,195, filed on Jul. 24, 2000.

(51) Int. Cl.
| | |
|---|---|
| *G06Q 20/10* | (2012.01) |
| *G06Q 20/04* | (2012.01) |
| *G06Q 20/06* | (2012.01) |
| *G06Q 20/34* | (2012.01) |
| *G06Q 20/36* | (2012.01) |
| *G06Q 40/04* | (2012.01) |
| *G06Q 30/06* | (2012.01) |

(52) U.S. Cl.
CPC ............ *G06Q 20/34* (2013.01); *G06Q 20/10* (2013.01); *G06Q 20/102* (2013.01); *G06Q 20/105* (2013.01); *G06Q 20/3674* (2013.01); *G06Q 20/3678* (2013.01); *G06Q 30/06* (2013.01); *G06Q 30/0601* (2013.01); *G06Q 40/04* (2013.01)

(58) Field of Classification Search
CPC ........ G06Q 30/06; G06Q 30/02; G06Q 20/04; G06Q 20/02; G06Q 20/20; G06Q 20/06; G06Q 20/10
USPC .................. 705/39, 40, 41, 42, 43; 235/379
See application file for complete search history.

(56) References Cited

U.S. PATENT DOCUMENTS

| | | | |
|---|---|---|---|
| 4,837,422 A | 6/1989 | Dethloff et al. | |
| 5,590,038 A * | 12/1996 | Pitroda | ......................... 705/41 |
| 5,802,497 A | 9/1998 | Manasse | |
| 5,832,089 A | 11/1998 | Kravitz et al. | |
| 5,883,810 A | 3/1999 | Franklin et al. | |
| 5,897,621 A | 4/1999 | Boesch et al. | |
| 5,901,229 A | 5/1999 | Fujisakl et al. | |

(Continued)

OTHER PUBLICATIONS

Notice of Allowance dated Oct. 26, 2012 issued in corresponding U.S. Appl. No. 12/246,967.

(Continued)

*Primary Examiner* — Nga B Nguyen
(74) *Attorney, Agent, or Firm* — Staas & Halsey LLP

(57) ABSTRACT

An electronic transaction system, comprising bearer bond means for providing an online electronic bearer bond having a monetary value, transaction means for performing monetary transactions with said bearer bond means, and network means for providing user access to said bearer bond means and said transaction means. A method and system of an electronic transaction is provided where the method includes issuing information of a card having a monetary value and applying the monetary value of the card towards a payment for a transaction.

16 Claims, 12 Drawing Sheets

(56) References Cited

U.S. PATENT DOCUMENTS

| | | | |
|---|---|---|---|
| 5,903,880 A | 5/1999 | Biffar | |
| 5,930,777 A | 7/1999 | Berber | |
| 5,953,710 A | 9/1999 | Fleming | |
| 5,983,207 A | 11/1999 | Turk et al. | |
| 6,014,646 A | 1/2000 | Vallee et al. | |
| 6,021,399 A | 2/2000 | Demers et al. | |
| 6,029,150 A | 2/2000 | Kravitz | |
| 6,044,360 A | 3/2000 | Picciallo | |
| 6,047,269 A | 4/2000 | Biffar | |
| 6,058,381 A | 5/2000 | Nelson | |
| 6,078,902 A | 6/2000 | Schenkler | |
| 6,138,107 A | 10/2000 | Elgamal | |
| 6,173,269 B1 | 1/2001 | Solokl et al. | |
| 6,343,284 B1 | 1/2002 | Ishikawa et al. | |
| 6,370,514 B1 | 4/2002 | Messner | |
| 6,394,343 B1 | 5/2002 | Berg et al. | |
| 6,415,271 B1* | 7/2002 | Turk | G06Q 20/02 705/39 |
| 6,467,684 B2 | 10/2002 | Fite et al. | |
| 6,473,500 B1* | 10/2002 | Risafi | G07F 7/1008 235/379 |
| 6,505,171 B1* | 1/2003 | Cohen | G06Q 30/06 235/380 |
| 6,766,306 B1* | 7/2004 | Matsuyama | G06Q 20/04 705/53 |
| 7,006,993 B1 | 2/2006 | Cheong et al. | |
| 7,143,064 B2 | 11/2006 | Picciallo et al. | |
| 7,814,009 B1* | 10/2010 | Frenkel | G06Q 20/04 705/26.8 |
| 8,095,463 B1* | 1/2012 | Hartmaier | G06Q 20/04 235/375 |
| 8,099,359 B1* | 1/2012 | Coyle et al. | 705/39 |
| 2001/0037209 A1* | 11/2001 | Tarbutton | G06Q 20/04 705/40 |
| 2001/0042784 A1* | 11/2001 | Fite | G06Q 20/202 235/379 |
| 2002/0026418 A1* | 2/2002 | Koppel | G06Q 20/04 705/41 |
| 2002/0095370 A1* | 7/2002 | Ebata | G06Q 20/06 705/39 |
| 2011/0251962 A1* | 10/2011 | Hruska | 705/72 |
| 2012/0030103 A1* | 2/2012 | Hughes | G06Q 10/00 705/41 |
| 2012/0234912 A1* | 9/2012 | Yankovich et al. | 235/379 |
| 2014/0025449 A1* | 1/2014 | Abifaker | 705/14.16 |
| 2014/0114800 A1* | 4/2014 | Levitt et al. | 705/26.8 |

OTHER PUBLICATIONS

Final Office Action dated Jan. 20, 2011 issued in corresponding U.S. Appl. No. 12/246,967.

Office Action dated Aug. 2, 2010 issued in corresponding U.S. Appl. No. 12/246,967.

Notice of Allowance dated Jul. 11, 2008 issued in corresponding U.S. Appl. No. 09/910,756.

Ex Parte Quayle Action dated Jan. 9, 2008 issued in corresponding U.S. Appl. No. 09/910,756.

Office Action dated Jun. 19, 2007 issued in corresponding U.S. Appl. No. 09/910,756.

Office Action dated Oct. 19, 2006 issued in corresponding U.S. Appl. No. 09/910,756.

Advisory Action dated Jul. 5, 2006 issued in corresponding U.S. Appl. No. 09/910,756.

Office Action dated Feb. 7, 2006 issued in corresponding U.S. Appl. No. 09/910,756.

Office Action dated Jul. 29, 2005 issued in corresponding U.S. Appl. No. 09/910,756.

Office Action dated Jan. 24, 2005 issued in corresponding U.S. Appl. No. 09/910,756.

Office Action dated Jun. 9, 2004 issued in corresponding U.S. Appl. No. 09/910,756.

U.S. Appl. No. 12/246,967, filed Oct. 7, 2008, Ahsan I. Raja.

U.S. Appl. No. 09/910,756, filed Jul. 24, 2001, Ahsan I. Raja.

U.S. Appl. No. 60/220,195, filed Jul. 24, 2000, Ahsan I. Raja.

* cited by examiner

ELECTRONIC BEARER BOND ONLINE TRANSACTION AND CARD SYSTEM AND METHOD THEREOF

CROSS-REFERENCE TO RELATED APPLICATIONS

This application is related to and claims priority to U.S. provisional application entitled ELECTRONIC BEARER BOND ONLINE TRANSACTION SYSTEM, U.S. Ser. No. 60/220,195, filed Jul. 24, 2000; U.S. application entitled ELECTRONIC BEARER BOND ONLINE TRANSACTION SYSTEM, U.S. Ser. No. 09/910,756, filed Jul. 24, 2001, now U.S. Pat. No. 7,447,661, U.S. application entitled ELECTRONIC BEARER BOND ONLINE TRANSACTION SYSTEM, U.S. Ser. No. 12/246,967, filed Oct. 7, 2008, and PCT application entitled ELECTRONIC BEARER BOND ONLINE TRANSACTION SYSTEM, International Serial No. PCT/US02/23479, filed Jul. 24, 2002, the contents of which are incorporated by reference herein.

BACKGROUND

1. Field

The present invention generally relates to bearer documents, and, more particularly, to interactive electronic bearer documents and interactive electronic bearer document databases.

2. Description

Generally, cash, or hard currency, is the most widely used and acceptable form of payment for non-electronic transactions worldwide. For electronic transactions, however, such as e-commerce transactions, cash as a form of payment may not be used. Instead, payment for electronic transactions is generally provided by a credit card account or bank account which is directly linked to the identity of a purchaser involved in the electronic transaction.

However, several problems exist with current e-commerce transaction settlement systems. For instance, users may be unwilling to purchase certain items on-line as the purchase of such items is directly linked to their identity. Current e-commerce settlement systems do not provide the buyer with anonymity, as cash normally provides for regular off-line purchases. Further, a majority of the world's population do not have access to credit card or bank accounts, and, therefore, may not perform electronic transactions at all.

Therefore, a need exists for a method which enables hard currencies to be used as payment in electronic transactions so that purchases may be anonymous. Furthermore, a need exists to eliminate the requirement for purchasers to have credit card or bank accounts to perform everyday electronic transactions.

SUMMARY

It is an aspect of the present invention to make any hard currency of the world equally acceptable to use as payment in an electronic transaction.

It is another aspect of the present invention to allow purchasers to perform electronic transactions without credit card and/or bank accounts.

It is a further aspect of the present invention to provide an interactive electronic bearer document for facilitating the use of hard currencies in electronic transactions.

It is yet another aspect of the present invention to provide an interactive electronic bearer document database for facilitating the use of hard currencies in electronic transactions.

The above aspects can be attained by an electronic transaction system which comprises bearer bond means for providing an online electronic bearer bond having a monetary value, transaction means for performing monetary transactions with the bearer bond means, and network means for providing user access to the bearer bond means and the transaction means.

The above aspects may also be attained by an electronic apparatus adapted for exchanging currency over a network which comprises an electronic document used for performing transactions, wherein the transactions contain data information associated with the electronic document, and a database processing and storing the data information to perform the transactions over the network.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION

Figure 1:
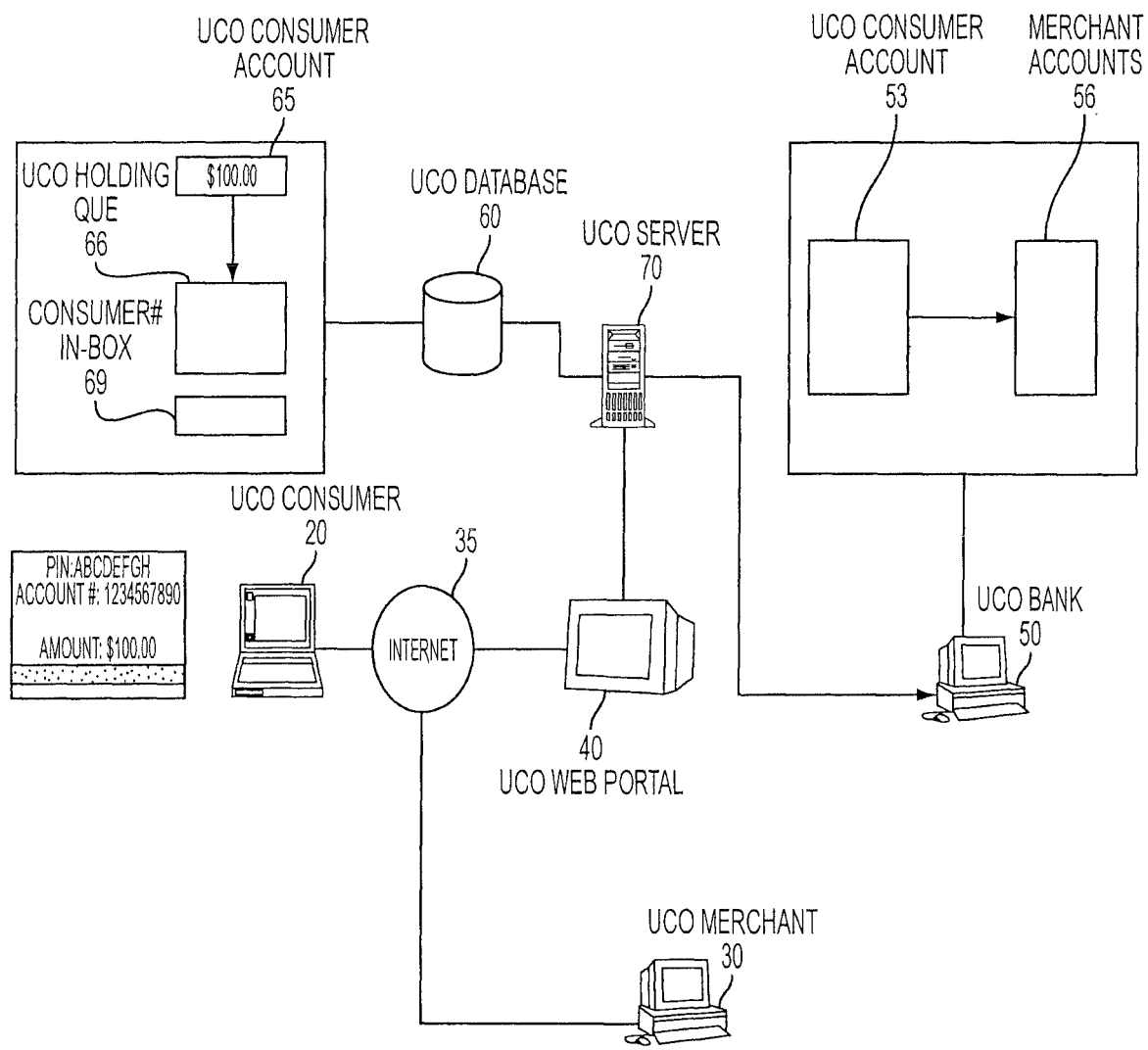
FIG. 1 shows a UCO payment system in accordance with the present invention.

An interactive electronic bearer document (IEBD) is a unique unit of trade. Similar to a bearer bond, it is payable to whoever possesses it. An IEBD is not linked to any one person's identity. The present invention allows for consumers and merchants to use IEBDs as a method of electronic payment.

IEBDs may be used anywhere the need for a transaction occurs. Furthermore, the IEBDs may be acquired by consumers in their own local currency. Since the IEBDs may be used in any international market, a rate of exchange is applied to each country's currency.

The use and trade of IEBDs is facilitated through the use of a secure Bearer Document Database (BDD). This database processes and stores all information pertaining to and associated with the trade of IEBDs. Owners of IEBDs and merchants may access the database through several different venues including, but not limited to, websites such as the Universal Cash Online (UCO) website, telephone interface systems such as the UCO telephone interface system, and kiosks such as the UCO kiosk. References to the UCO and Universal Cash operations as set forth herein are not limited to online use and UCO website. Instead, the Universal Cash may be implemented in various ways described herein. For example, according to an embodiment of the present invention, a Universal Cash account holder may chose to send an image *(txt) of the user's card using a Multimedia Messaging Service (MMS) to a smart phone and can use numbers, barcode, or NFC (Near Field Communication) methods to use the a prepaid card image through the smart phone to make payments, as needed. Prepaid card information can interact by providing information codes to smart phone including with but not limited to NFC Capability, which can be use to perform transactions. The phone can be any kind of phone including a phone with touch screen capability. Operation of the prepaid card process including using a device such as a smart phone is explained in detail below with respect to FIG. 7.

Moreover, an image can be encrypted and password protected and can be signed by smart phones touch screen for added security.

Advantageously, a multitude of anonymous consumers from many different countries are able to utilize IEBDs and associated UCO products and services regardless of their age or their credit worthiness.

Unlike credit or bank accounts, a UCO consumer is not required to provide any information concerning his or her identity. The IEBDs may be purchased by consumers from various off-line (i.e. brick and mortar) and on-line points of sale including, but not limited to: banks, post offices, internet service providers, retail stores, grocery stores, convenience stores, and web sites such as the UCO web site.

According to an embodiment of the present invention, IEBDs are not valid and may not be used for purchases until they have been authorized by an affiliated vendor. For an IEBD to be authorized, for example, a vendor inputs its Vendor Identification Number (VIN) along with the IEBD account number to authorize the card for use.

IEBDs may be made available to consumers in their local currency. The value of an IEBD is linked to a base currency. A common base currency which may be selected is U.S. dollars, because U.S. currency is generally universally accepted. The consumer pays an appropriate exchange rate to convert his or her type of currency into the equivalent base currency. Due to the currency exchange features of IEBDs, they become effectively a universally acceptable method of payment.

Advantageously, the present invention allows for a user to set up and activate either a UCO card account, or a credit card account. This is achieved by, for example, the user entering the UCASH web site by selecting account activation, including the type of account to be set up (UCO card or credit card) by entering UCASH card and personal information, by choosing a password, and by receiving an account number on-line, wherein the account number may be either a UCO card account number or a credit card account number, such as a Visa or MasterCard account number.

After an IEBD is authorized, the consumer may use the IEBD to perform electronic transactions. An initial secure PIN is printed on the card, but may be concealed by scratch off or peeler media. In order to perform a transaction, the consumer provides the IEBD account number, the initial PIN, and any other pertinent information printed on the IEBD medium (e.g. date printed, country of purchase, or other information) to the merchant. Advantageously, the UCO consumer has the ability to change the PIN number at any time via the UCO web site or over the phone to further secure access to their funds.

Every transaction which is performed using an IEBD is stored on the BDD. If the proper security information is provided, this information along with other transaction data may be accessed through the UCO web site. The UCO web site also provides additional features for convenience and security including, but not limited to: shopping online, transaction histories, language translations, merchant validation, currency conversions, shippers online, tariff information, anonymous e-mail, bulletin boards, luck draw process, interactive features, and concierges services.

The interactive features allow the owner to control the use of the funds represented by the IEBD. These features may be accessed and activated through a portal such as the UCO web portal. Initial verification information may be supplied to gain limited access to the central transaction database including the account number of the IEBD and a secure PIN.

An individual IEBD has no value until it is authorized by the central transaction BDD. The IEBDs may be authorized through a set of pre-defined protocols, or they may be authorized in a manner prescribed by a BDD operator.

The owner of the IEBD may opt to use all or a portion of the available funds to perform electronic transactions. An authorized amount is deducted from the total amount. The remaining value can be securely "vaulted" until authorized for use.

After card activation, a user may check the balance of his or her card after activation by, for example, selecting the type of card (UCO card or credit card) for the desired balance, providing the chosen card number, providing a password for the debit card accounts, if any, and by viewing the current balance of the chosen card displayed on-screen.

A user is also able to check his or her statement on-line by, for instance, selecting a type of card (UCO card or credit card), providing the chosen card number, providing 0a password for the debit card accounts, if any, and by viewing the statement of the chosen card displayed on-screen. The statement is generated from the transactions stored on the BDD.

Furthermore, a user may transfer funds between accounts. A user may transfer funds from a UCO card account to a debit card account. As a result, the balance of the debt card account may be increased. The user may transfer either the entire remaining balance of the UCO card or fixed portions of the balance to the account. A user may also transfer funds from credit card accounts to a UCO card. Several IEBDs of the same or differing amounts may be consolidated into one IEBD via the web portal. IEBD holders may further secure their funds by providing additional personal information.

A user may authorize a one-time purchase using either a UCO card or credit card. For example, this may be accomplished by the user selecting either a UCO card or credit card, by entering in the account number of the chosen card, by entering in a password for the card, and by selecting a duration and amount for which the one-time purchase will be valid for. Optionally, the user may select certain restrictions on the one-time certificate so that the certificate cannot be used to purchase certain types of goods and/or services. Moreover, the owner of an IEBD may also select where the document may be spent. After all such information is entered, the user is presented with an account number which can be used for a one-time purchase.

Once the certificate is created, an owner of the certificate may use the certificate on-line. The certificate works identically to VISA/MC number, with the advantage that it does not require address/name/or ZIP verification, resulting in anonymous purchases.

Anonymous E-mail Communication is another unique feature that is available through the web site for IEBD holders. This feature allows consumers to create an email account that is linked to their IEBD account. As a result, the e-mail account is not linked to the identity of the holder of the IEBD. IEBD holders may receive or send mail and check their transaction history. They may also use the e-mail platform to facilitate purchases, release their "vaulted" funds, and perform balance transfers to other card accounts.

According to an embodiment of the present invention, an email communication capability may be made available through the web site for IEBD holders (or card holders). This feature allows consumers to create an email account that is linked to their IEBD account not the consumers' identity. IEBD holders may receive or send mail and check their transaction history from this location as well as use the e-mail platform to facilitate purchases, release their "vaulted" funds, perform balance transfers to other card accounts, etc.

The Universal Cash e-mail account may be linked with the IEBD account and may be initially accessed by the Universal Cash scratch off PIN, for example. Upon activation of the card, the anonymous email account will remain active as long as the accounts are linked to a valid IEBD account. When the balance of an IEBD is consumed or expired, a new valid IEBD can be linked to an existing e-mail account. Accordingly, the email platform of an embodiment enables consumers especially those without an e-mail account and/or computer to instantly possess an e-mail account including to communicate with friends and family, receive order reference and confirmation information, to transfer funds to other Universal Cash card holders, etc.

The Universal Cash e-mail account is linked to the IEBD account and may be initially accessed by the Universal Cash scratch off PIN. Upon activation of the card, the anonymous email accounts remain active as long as they are linked to a valid IEBD account. When the balance of an IEBD is consumed or expired, a new valid IEBD may be linked to an existing e-mail account.

The anonymous e-mail features of the present invention advantageously enable consumers who may not possess an e-mail account or a computer to: communicate with friends and family, receive order reference and confirmation information, and to transfer funds to other UCO cardholders.

Through the use of collaborative filtering techniques, UCO merchants may target anonymous UCO consumers via their anonymous e-mail accounts by their spending habits alone. This customer anonymity encourages spending on the part of the UCO customer, which, in turn, helps merchants to more correctly identify the spending habits of UCO customers. According to an embodiment, Universal Cash merchants may target Universal Cash consumers by spending habits not necessarily by the consumers' identity or profile. Moreover, the system and method offer an additional level of security by providing a platform to sub-divide and secure available funds without requiring unwanted exposure to web merchants and hackers.

Furthermore, a UCO Bulletin Board may be accessed from the UCO web site. The UCO Bulletin Board allows for UCO merchants to conduct direct marketing and sales to anonymous UCO cardholders. UCO cardholders searching for the best deal on a particular item may post their request for that item on the bulletin board. Merchants servicing that market are able to browse these requests and respond to the consumer's anonymous e-mail account with an offer to provide the specific requested goods and/or services.

The consumer may then select the best value from several merchants who made offers in response to the consumer's request. This service effectively brings the merchants to the consumers. Therefore, merchants no longer have to wait passively for consumers who have very specific needs to come to them.

UCO Consumer Data Calculators (CDCs) are available to aid UCO consumers as they search and shop online. For instance, a UCO customer is able to convert their IEBDs into any currency of the world, in real time, at the official rates of exchange. Furthermore, the present invention provides comparison shop search engines which query the UCO database. The search engines may be offered to UCO consumers by, for example, the UCO web site. Using the search engines, consumers are able to compare, for example, a US product with its Chinese counterpart. Comparisons detailing the cost of shipping, tariffs, taxes, clearing and forwarding, and time to ship are advantageously available to international consumers and national consumers alike.

The present invention further provides other services to UCO customers, including UCO Purchasing Services. Through the UCO Purchasing Services an IEBD becomes a universally acceptable method of payment. For instance, in the event that a merchant does not accept an IEBD as a method of payment, UCO Purchasing Services provides payment to a merchant on behalf of a UCO customer's IEBD, via a payment method that the merchant does accept (e.g. Visa, MC, AmEx, check, money order, wire transfer, or other form of payment).

In order to facilitate and monitor the trading of Interactive Electronic Bearer Documents (IEBDs), the present invention collects and stores information pertaining to the IEBDs in the BDD.

Every data entry in the BDD is related to an account number of an individual IEBD.

The present invention allows consumers to purchase Universal Cash Online (UCO) cards anonymously online using their credit cards. The process allows online merchants or retailers to sell UCO cards without any knowledge of the unique account identifier or PIN number associated with a UCO card.

According to an embodiment, a user is able to select a preferred payment protocol (for example, payment method such as visa, mastercard, amex, etc.). In other words, the present invention enables use of existing payment protocol to handle transactions and thus does not require use of pre-designated protocol.

The present invention further allows for organizations, including but not limited to ISPs, banks, private label organizations, and credit card companies, to be able to offer UCO cards for sale online to their customers who prefer to use the anonymous features of UCO cards over traditional credit cards where purchases are tied to a specific individual.

As an example, a batch of Universal Cash cards may be supplied to online vendors with the account number hidden from view in special concealer packaging. This packaging conceals the account numbers, while clearly displaying a card batch number, denomination, and UPC code for the Universal Cash card.

Although a vendor may not have access to the individual card account numbers, they may still sell these cards to their customers by entering the UPC code that is printed on the outside of the card packaging.

Thereafter, the online consumer may then remove the concealer packaging exposing the card account and PIN number. The consumer may then activate the card through a web site, such as the Universal Cash Online web site.

The associated credit card company, or other issuer of the UCO card, would know that they had sold, for example, a $50 card to John Doe. However, they would not be aware of the account number of the card. Therefore, John Doe is now free to perform online purchases anonymously using the UCO card.

The present invention, through Universal Cash Online Direct Link Services, allows for individual consumers to have the ability to chat and share information online directly with each other on a one-to-one basis via a web portal such as the UCO web portal. These services are offered to allow for open consumer communication. This general exchange of information and opinions helps consumers to stay abreast of activities occurring in the cyber-marketplace.

Furthermore, consumers may form chat communicates pertaining to various specific topics.

FIG. 1 shows a UCO payment system in accordance with the present invention. A description of the components comprising the payment system will first be described, with a description of the interaction between components following thereafter.

IEBD10 may be a card, or any other form of readable media, including a virtual card, which represents a dollar value. According to an embodiment of the present invention, IEBD 10 is not registered in the name of a particular individual. IEBD 10 may be used to purchase goods and/or services by whoever possesses the correct password or PIN written or displayed on the card.

Consumer 20 is an individual who has purchased an IEBD 10 at any one of various points of sale, including off-line and on-line points of sale.

Merchant 30 is a merchant which has agreed to terms and conditions outlined for accepting IEBDs.

Web Portal 40 is a website which offers consumers many e-commerce functions and services, including payment transactions.

Bank 50 is a financial institution which holds UCO consumer payment accounts 53 and various merchant accounts 56.

BDD 60 is software that processes internal payment transactions and coordinates payments from UCO Consumer 20 to UCO merchant 30.

Server 70 is a computer used to coordinate processes between BDD 60 and external inputs including: web portal 40, bank 50, merchant 30, and consumer 20.

Consumer 20 elects to purchase goods and/or services from web portal 40. Web portal 40 displays an itemized description of the products or services in the UCO shopping cart along with pertinent transaction information including, but not limited to including: amount to complete transaction (cost, tax, shipping, tariff, etc.), shipping address, and merchant name and address. Web portal 40 prompts, for example:

"Is this correct?_____"
"Do you wish to continue?_____"
"Enter Account#?_____"

Upon receiving the Account #, UCO server 70 queries UCO database 60 to determine if funds are available to complete the transaction.

If sufficient funds are present, UCO web portal 40 may prompt, for example:

"Enter PIN or Password to begin transaction _____"

Once the PIN or Password has been verified, UCO server 70 connects with UCO merchant 30 via Internet 35.

Information from the shopping cart is sent to UCO merchant 30. The web portal may prompt, for instance:

"Is this correct?_____"
"Do you wish to continue?_____"

If UCO merchant 30 wishes to continue, UCO web portal 40 instructs UCO merchant 30 to initiate the order and transmit "order reference data" to UCO server 70. Next, the merchant initiates the order, and transmits "order reference data" as outlined in a standard terms and conditions statement.

Once the "order reference data" has been received, UCO server 70 processes the information and initiates an internal funds transfer. This is accomplished by the following operations:

1. Funds are transferred from the account associated with IEBD 10 to a UCO holding queue 66.
2. The purchase amount is deducted from UCO consumer customer account 63.
3. Transaction data is processed and deposited in, for instance, consumer IN-box 69.

At this point a UCO consumer's input is no longer required to complete the transaction. UCO web portal 40 prompts UCO consumer 20: "please change your PIN or Password before logging off."

In order to receive payment, UCO merchant 30 is required to transmit the "confirmation data" outlined in the agreed upon terms and conditions. UCO merchant 30 transmits "confirmation data" to UCO server 70.

UCO server 70 processes the "confirmation data", and subtracts the "transaction amount" from UCO holding queue 66, and deposits "confirmation data" in consumer's IN-box 69.

UCO server 70 establishes a secure connection with UCO bank 50 to initiate an "external" funds transfer. UCO server 70 instructs UCO bank 50 to transfer the transaction amount from the UCO account to the merchant account.

UCO bank 50 then performs the transfer of funds, by, for example, transmitting "transaction data" to UCO server 70.

UCO server 70 processes the "transaction data, transmits the "transaction data" to UCO merchant 30 for verification, and deposits the final confirmation in UCO Consumer IN-box 69.

Figure 2:
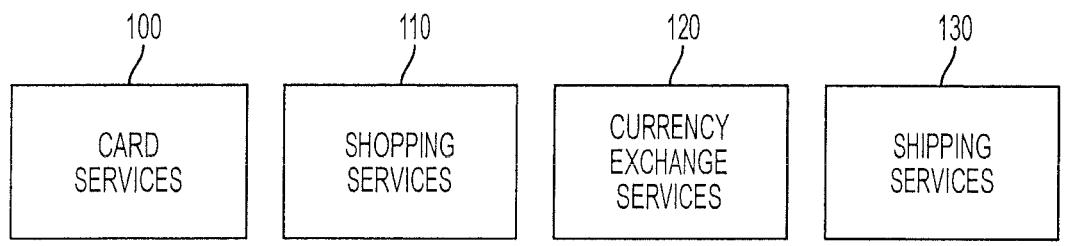
FIG. 2 shows user-selectable UCO services in accordance with the present invention.

FIG. 2 shows user-selectable UCO services in accordance with the present invention. Card services 100 allows a UCO customer to purchase cards on-line and access their existing account or accounts. UCO customers may purchase an UCO card on-line using traditional methods of payment. Further, card services 100 allows users to change PINs, access E-mail services, consolidate cards, access interactive services, check card balances, and view their transaction history.

The present invention not only allows international and domestic consumers the ability to spend cash on the Internet, but it also streamlines the online shopping experience by providing consumers a multitude of services. Shopping services 110 enables customers to shop by country or location, shop by language, shop by merchant, and shop by product or service, and to comparison shop, all using a UCO shopping cart.

The value of an IEBD may be linked to a base currency of a particular country. Currency exchange services 120 allows a user to pay an appropriate exchange rate to convert his or her type of currency into the equivalent base currency if the user's currency is different than the base currency.

Shipping services 130 allows consumers the ability to shop and ship from one location, and includes services including, but not limited to: a shipping fee calculator, package tracking, clearing and forwarding services, marine shipping insurance, and links to carrier websites.

Figure 3:
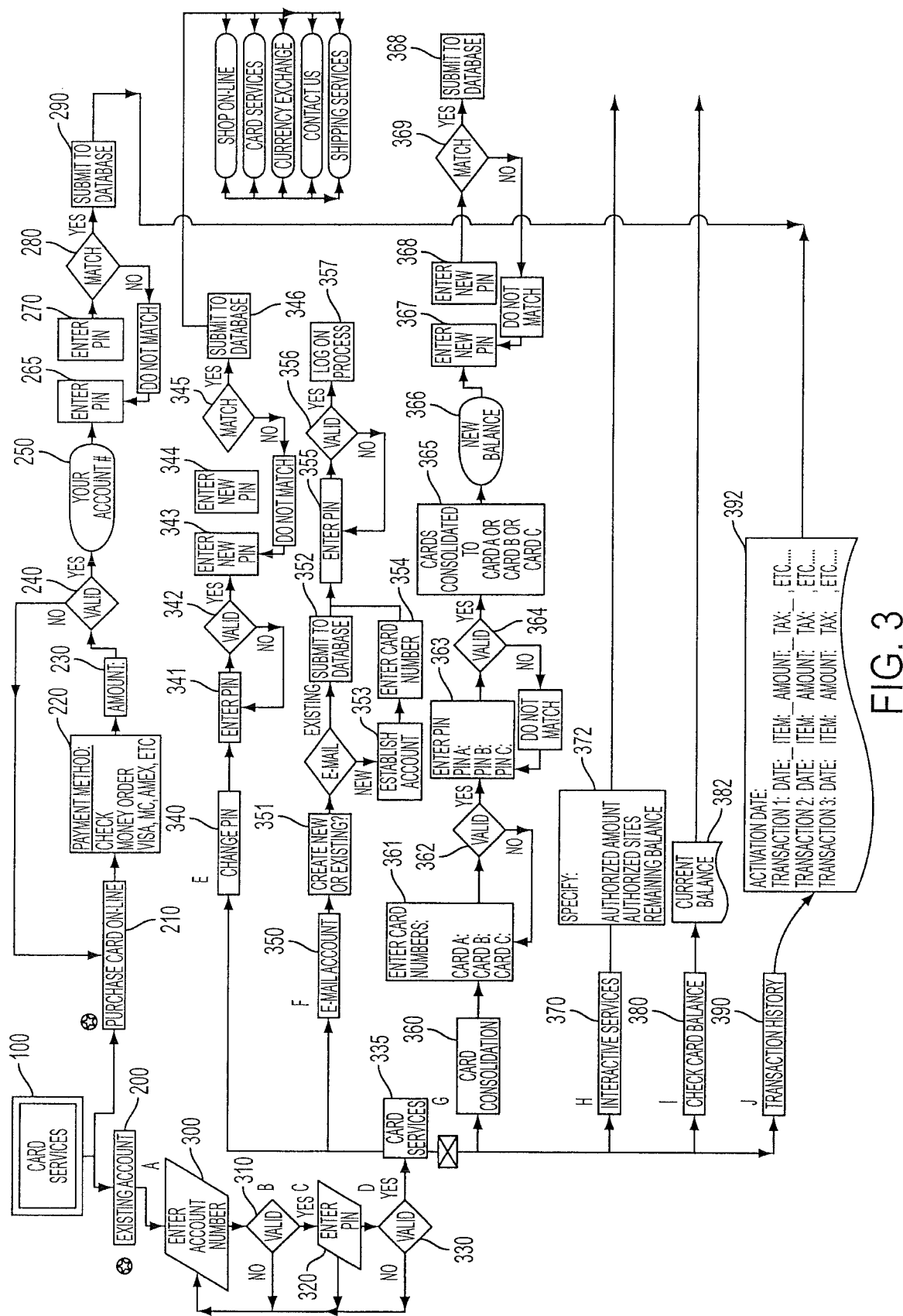
FIG. 3 is a flowchart illustrating card service functions in accordance with the present invention.

FIG. 3 is a flowchart illustrating card service functions in accordance with the present invention. Upon selecting card services 100 by, for example, clicking a "card services" icon, the user may select to access an existing account at operation 200, or purchase a card on-line at operation 210.

If a user decides to purchase a card on-line, processing proceeds to operation 220, at which point the user selects a method of payment for purchasing a UCO card on-line using, for example, check, money order, or a credit card. At operation 230, the user selects a monetary amount to purchase the card for. Operation 240 determines if the user's choice of payment is valid, by, for example, making sure that sufficient funds are available in the user's selected choice of payment account. If so, then processing proceeds to operation 250; otherwise, processing is directed back to operation 210.

At operation 250, the user is assigned a UCO account number. At operation 265, the user is prompted to enter a PIN for the new account, and at operation 270, the user is prompted to enter the new PIN again for verification purposes. At operation 280, it is determined whether the two PINs entered at operations 265 and 270 match. If the two PINs match, then the entered information is submitted to UCO database 60 at operation 290 for storage and the user is presented with a main UCO services menu. If, on the other hand, the two PINs do not match, then processing is directed back to operation 265.

If the user decides to access an existing account, then processing proceeds to operation 300, where the user is prompted to enter his or her card account number.

Processing next proceeds to operation 310, where UCO database 60 is queried to determine the validity of the entered card account number. If the card account number matches a number in UCO database 60, then processing proceeds to operation 320. Otherwise, if the card number does not match a number in UCO database 60, then processing is directed back to operation 300, where the user may enter another account number.

At operation 320, the user is prompted to enter a PIN. Processing proceeds to operation 330, at which point UCO database 60 is queried to determine the validity of the entered PIN. If the PIN matches the PIN stored in UCO database 60 associated with the entered account number, then processing proceeds to operation 335, the card services sub-menu. Otherwise, if the PIN is determined to be invalid, then processing is directed back to operation 320.

The card services sub-menu at operation 335 gives a user at least the following options: Change PIN, E-mail services, Card Consolidation, Interactive Services, Check Card Balance, and Transaction History.

If the user opts to change his or her PIN, then processing proceeds to operation 340, and the user is prompted to enter a current PIN into the system at operation 341. After entry, UCO database 60 is queried at operation 342 to determine the validity of the entered PIN. If the PIN matches the PIN stored in UCO database 60 associated with the user's entered account number (at operation 300), then processing proceeds to operation 343. Otherwise, if the PIN does not match the PIN stored in UCO database 60 associated with the user's entered account number (at operation 300), then processing is directed back to operation 341. According to an embodiment of the present invention, three incorrect attempts to enter a correct PIN will signal a red flag for improper behavior.

At operation 343, the user is prompted to enter the new PIN, and at operation 344, the user is prompted to enter the new PIN again for verification purposes. At operation 345, it is determined whether the two PINs entered at operations 343 And 344 match. If the two PINs match, then the entered information is submitted to UCO database 60 for storage at operation 346. If, on the other hand, the two PINs do not match, then processing is directed back to operation 343.

From the card services sub-menu at operation 335, if the user chooses "E-mail Services," then processing proceeds to operation 350. At operation 351, the user is given the option of creating an e-mail account or using an already existing e-mail account. If the user chooses to use an existing account, then processing proceeds to operation 352, at which point existing account holders are instructed to input an existing e-mail address into a given field. If instead the user opts to create an e-mail account, then processing proceeds to operation 353 at which point non-account holders are provided with an anonymous application form in which to create their account. After the account is established, users are requested to enter their new account number at operation 354.

At operation 355, the user is prompted to enter a proper PIN into the given field. At operation 356, UCO database is queried to determine the validity of the entered PIN. If the PIN matches the PIN coinciding with the one stored in UCO database 60 for the entered e-mail account, then processing proceeds to operation 357, where users are presented with an e-mail sub-menu after a log on process is completed. If, however, the entered e-mail PIN does not match its corresponding e-mail account stored in UCO database 60, then processing is directed back to operation 355. According to an embodiment of the present invention, 3 incorrect attempts will signal a red flag for improper behavior.

From the card services sub-menu at operation 335, if the user chooses "Card Consolidation," then processing proceeds to operation 360. Card consolidation allows a user to consolidate the value of multiple cards into one card. At operation 361, the user is prompted to enter the account numbers of the cards that he/she wants consolidated. After all the card account numbers are entered, then processing proceeds to operation 362, where UCO database 60 is queried to determine the validity of the account numbers.

If the entered card account numbers match account numbers in UCO database 60, then processing proceeds to operation 363; otherwise, processing is directed back to operation 361, at which point the user may attempt to enter valid account numbers again. According to an embodiment of the present invention, three incorrect attempts will signal a red flag for improper behavior.

At operation 363, the user is prompted to enter valid PINs for each account number entered at operation 361. After all PINs are entered, processing proceeds to operation 364.

At operation 364, UCO database 60 is queried to determine the validity of PINs entered at operation 363. If the entered PINs match the PINs stored in the UCO database 60 associated with the entered account numbers, then processing proceeds to operation 365. Otherwise, processing is directed back to operation 363.

At operation 365, card balances and transaction histories are consolidated to one of the existing UCO cards.

At operation 366, the new balance is displayed along with card information.

At operation 367, the user is given the option of changing the PIN of the of the consolidated account. At operation 367, the user is prompted to enter the new PIN, and at operation 368, the user is prompted to enter the new PIN again for verification purposes. At operation 369, it is determined whether the two PINs entered at operations 367 And 368 match. If the two PINs match, then the entered information is submitted to UCO database 60 for storage at operation 368. If, on the other hand, the two PINs do not match, then processing is directed back to operation 367.

From the card services sub-menu at operation 335, if the user chooses "Interactive Services," then processing proceeds to operation 370. Interactive services are offered for additional levels of security. At operation 372, a user is given the following options, including but not limited to: "Authorize Amount" enables a user to authorize a specific amount to be used per purchase—for example, parents may customize their child's card to allow for purchases of no more than $15 each; "Authorize Sites" allows a user to authorize the card to be used on certain sites—for example, parents may customize their child's card to allow for purchases at the Disney store, Toys R Us, and Amazon.com; and "Remaining Balance" allows users to authorize the specific amount to be used on multiple purchases—for example, parents may give their child a $100 card and customize the card to allow for purchases totaling no more than $25.00.

From the card services sub-menu at operation 380, if the user chooses "Check Card Balance," then processing proceeds to operation 380. Operation 382 displays the current balance of a card to the user.

From the card services sub-menu at operation 390, if the user chooses "Transaction History," then processing proceeds to operation 390. Operation 392 displays a complete history of card transactions.

Figure 4:
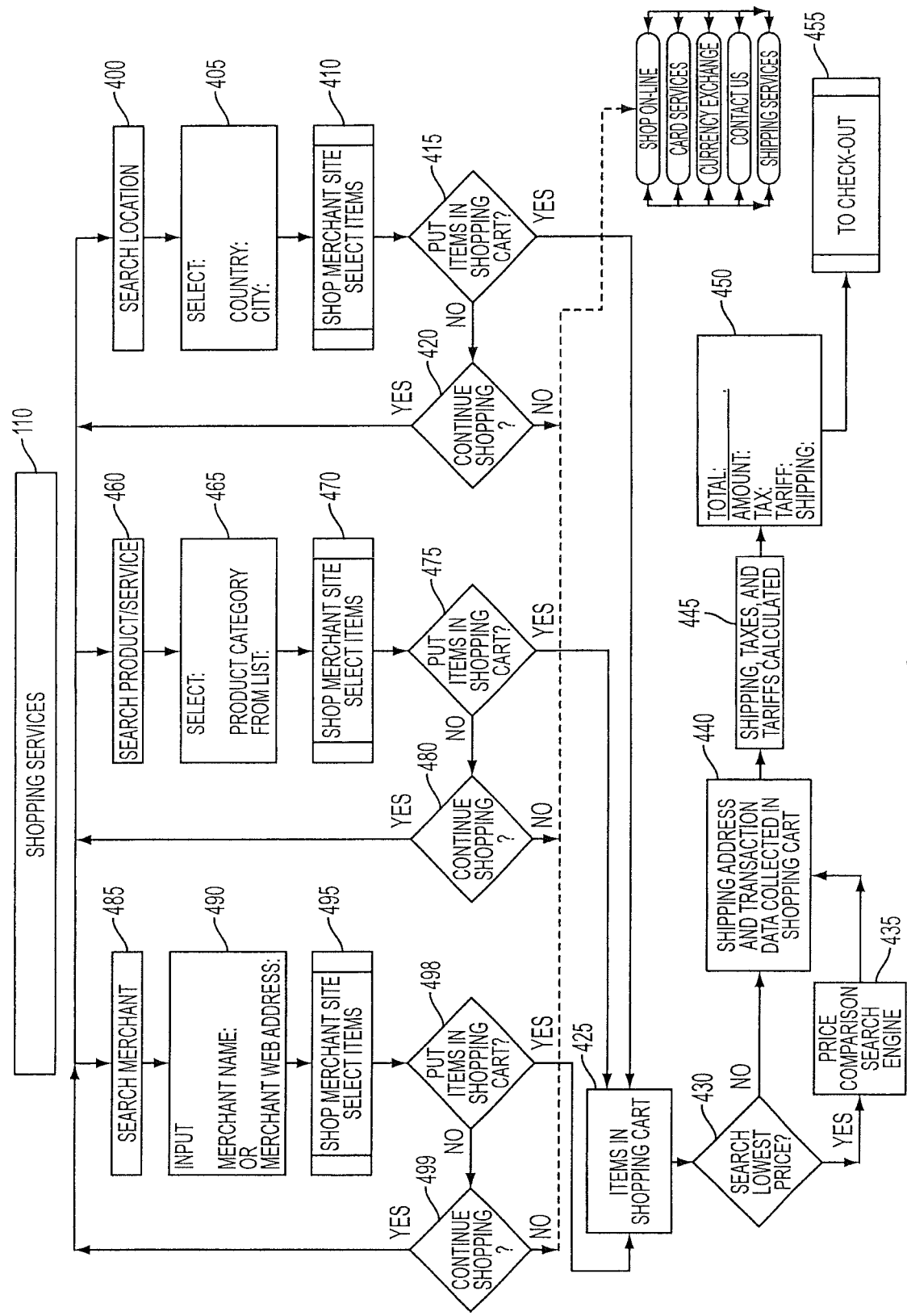
FIG. 4 is a flowchart illustrating shopping service functions in accordance with the present invention.

FIG. 4 is a flowchart illustrating shopping service functions in accordance with the present invention. Shopping services 110 enables customers to shop by country or location, shop by language, shop by merchant, and shop by product or service, and to comparison shop, all using a UCO shopping cart. If a user chooses to shop by location, then processing proceeds to operation 400. At operation 405, the user may select a location by country and city, for example. At operation 410, the user shops merchant sites in the selected location and selects which items he or she wants to buy. At operation 415, the user is given the option of placing the selected item or items into a shopping cart. If the user decides to place the selected items in a shopping cart, then processing proceeds to operation 425, where the selected items are placed in a virtual shopping cart for temporary storage. Otherwise, processing proceeds to operation 420, at which point the user is given the option to continue shopping. If the user decides to continue shopping, then the user may select to continue shopping by location at operation 400, continue shopping by product/service at operation 460, or continue shopping by merchant at operation 485. Otherwise, the user is presented with the main menu as depicted in FIG. 2. According to another embodiment of the present invention, the user may be presented with a main menu comprising a shop on-line selection, a card services selection, a currency exchange selection, and a shipping services selection.

After the items are placed in the shopping cart at operation 425, processing proceeds to operation 430, where the user is given the option of searching for the lowest price for all of the items in the shopping cart. If the user opts to search for the lowest price, then processing proceeds to operation 435 at which point a price comparison search engine is used to select those merchants having the lowest price for the items stored in the shopping cart, and processing next proceeds to operation 440. If, on the other hand, the user does not choose to search merchants for the lowest price of the shopping cart items, then processing proceeds directly to operation 440.

At operation 440, the shipping address of the user is collected and the transaction data collected in the shopping cart are used to calculate shipping costs, taxes, and tariffs at operation 445. From operation 445, processing proceeds to operation 450, at which point the total charges are displayed to the user including the amount of the selected item or items, and tax, tariff, and shipping charges. At operation 455, the user proceeds to checkout, at which point the total charges are deducted from the user's UCO account.

If a user chooses to shop by product/service, then processing proceeds to operation 460. At operation 465, the user selects which product or service categories he or she is interested in. At operation 470, merchant sites are chosen which have the selected products/services, and the user shops those merchant sites to select items to purchase. At operation 475, the user is given the option of placing the selected item or items into a shopping cart. If the user decides to place the selected items in a shopping cart, then processing proceeds to operation 425, where the selected items are placed in a virtual shopping cart for temporary storage. Otherwise, processing proceeds to operation 480, at which point the user is given the option to continue shopping. If the user decides to continue shopping, then the user may select to continue shopping by location at operation 400, continue shopping by product/service at operation 460, or continue shopping by merchant at operation 485. Otherwise, the user is presented with the main menu as depicted in FIG. 2. According to another embodiment of the present invention, the user may be presented with a main menu comprising a shop on-line selection, a card services selection, a currency exchange selection, and a shipping services selection.

If a user chooses to shop by merchant, then processing proceeds to operation 485. At operation 490, the user enters the desired merchant's name or web address. At operation 495, the merchant site is contacted and the user is able to select items from the chosen merchant site. At operation 498, the user is given the option of placing the selected item or items into a shopping cart. If the user decides to place the selected items in a shopping cart, then processing proceeds to operation 425, where the selected items are placed in a virtual shopping cart for temporary storage. Otherwise, processing proceeds to operation 499, at which point the user is given the option to continue shopping. If the user decides to continue shopping, then the user may select to continue shopping by location at operation 400, continue shopping by product/service at operation 460, or continue shopping by merchant at operation 485. Otherwise, the user is presented with the main menu as depicted in FIG. 2. According to another embodiment of the present invention, the user may be presented with a main menu comprising a shop on-line selection, a card services selection, a currency exchange selection, and a shipping services selection.

Figure 5:
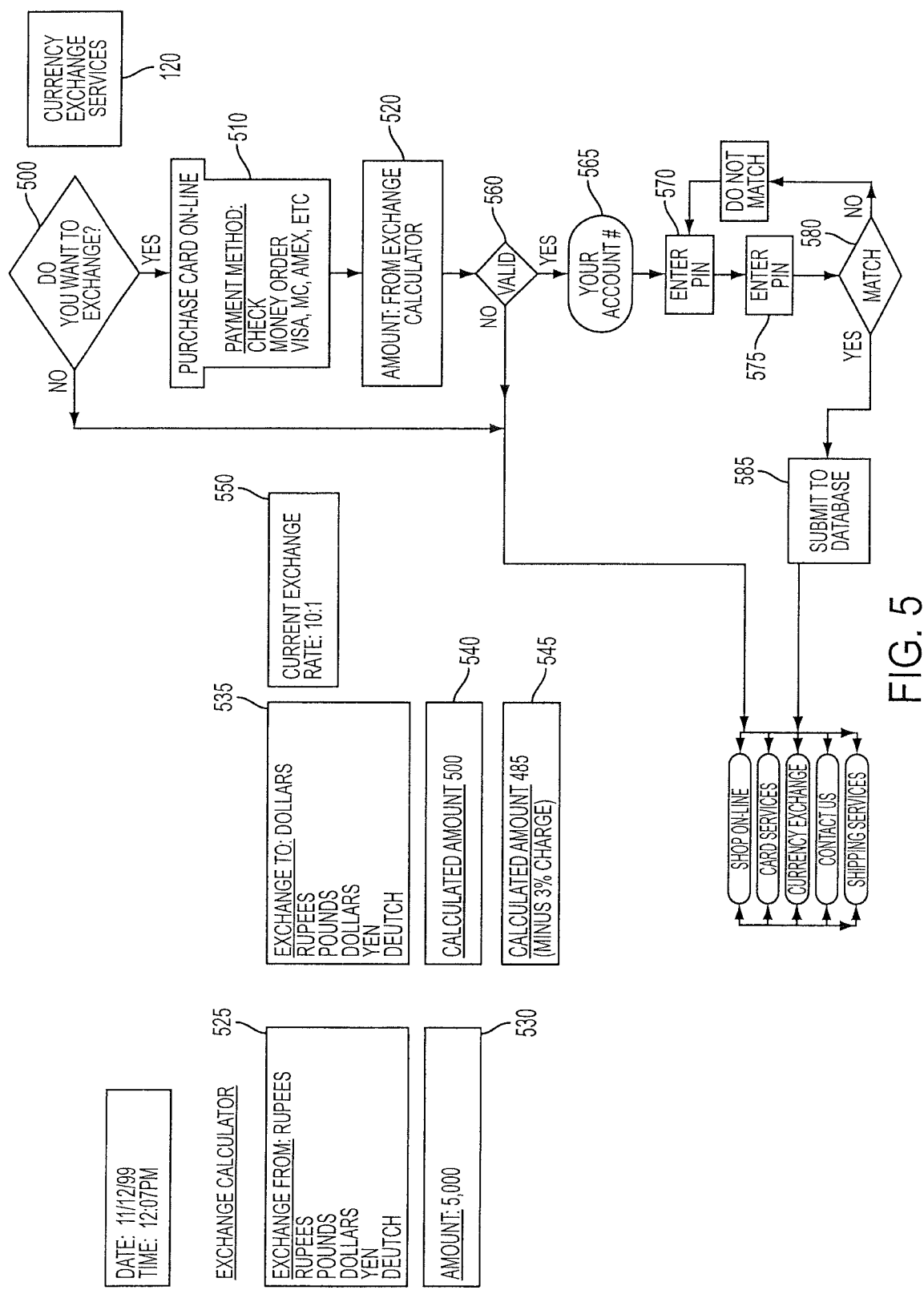
FIG. 5 is a flowchart illustrating currency exchange functions in accordance with the present invention.

FIG. 5 is a flowchart illustrating currency exchange functions in accordance with the present invention. Currency exchange services 120 allows a user to pay an appropriate exchange rate to convert his or her type of currency into the equivalent base currency if the user's currency is different than the base currency. At operation 500, the user is prompted to determine if he or she desires to exchange currency. If the user does not want to exchange currency, then the user is presented with a main UCO services menu.

Otherwise, processing proceeds to operation 510, at which point the user purchases a UCO card on-line using, for example, check, money order, or a credit card. At operation 520, a calculated exchange amount is determined based on user input. For example, as shown in screen 525, a user selects a currency to exchange from after viewing a list of currencies, including but not limited to: rupees, pounds, dollars, and yen. Furthermore a user enters an exchange amount as shown in screen 530. At screen 535, the user selects the currency to exchange to, selected from a list of currencies. At screen 540, the calculated amount of the exchange to currency is displayed to the user, and at screen 545, the calculated amount minus an optional surcharge is displayed to the user. Optionally, the currency exchange rate is also displayed to the user at screen 550.

At operation 565, the user is prompted to enter a PIN for the new account. At operation 570, the user is prompted to enter the new PIN, and at operation 575, the user is prompted to enter the new PIN again for verification purposes. At operation 580, it is determined whether the two PINs entered at operations 565 and 570 match. If the two PINs match, then the entered information is submitted to UCO database 60 at operation 585 for storage and the user is presented with a main UCO services menu. If, on the other hand, the two PINs do not match, then processing is directed back to operation 570.

Figure 6:
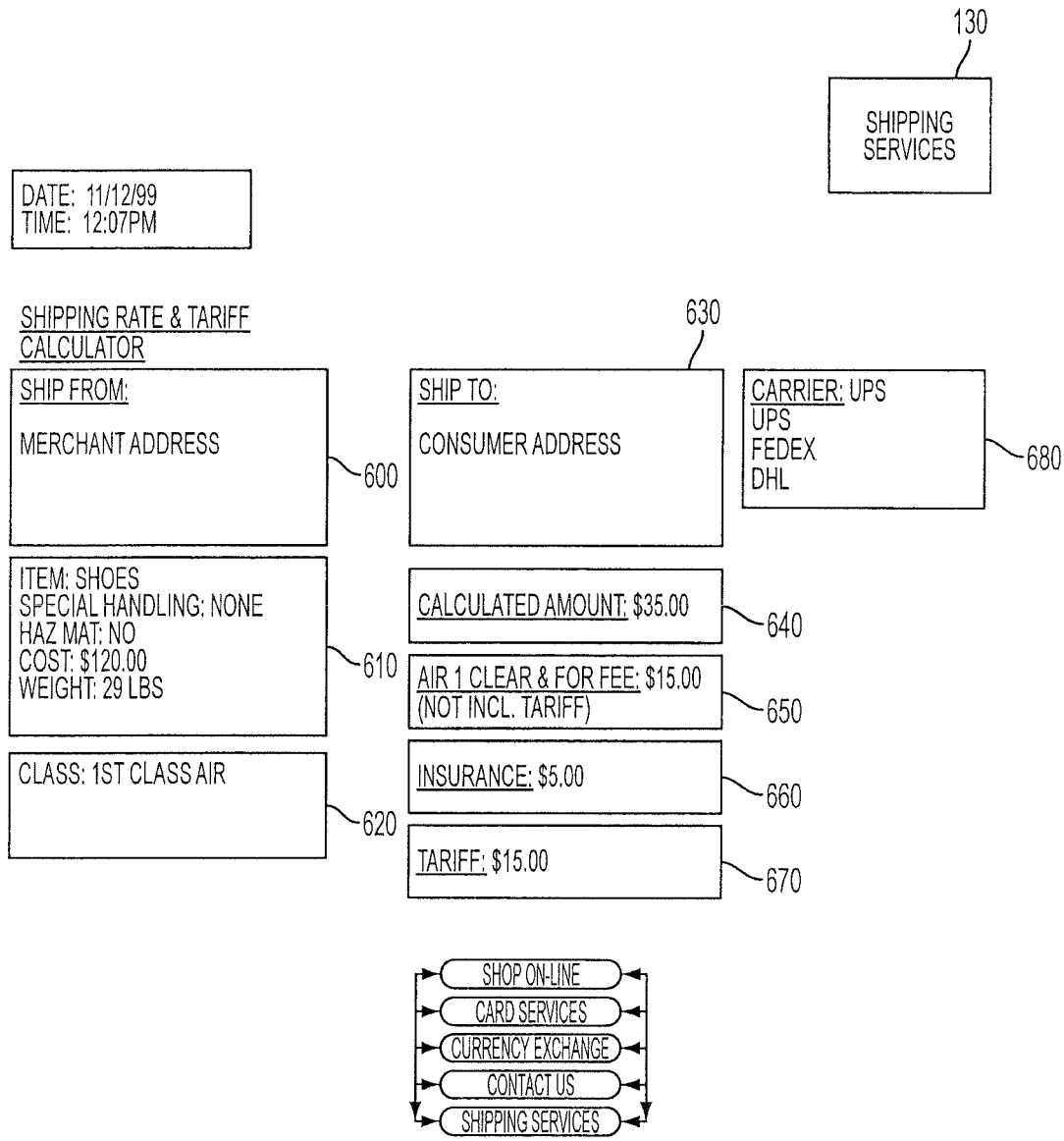
FIG. 6 is a flowchart illustrating shipping services functions in accordance with the present invention.

FIG. 6 is a flowchart illustrating shipping services functions in accordance with the present invention. Typically, information such as merchant address 600, item information 610, including the name of the item, special mail handling requirements (if any), cost of the item, and weight are all retrieved from the merchant site where the item was purchased from. The user is given the option of how the item will be delivered at screen 620. At screen 630, the consumer's address is displayed for verification purposes—this information may be retrieved from UCO database 60 based upon the user's account number. The calculated amount is displayed at screen 640, the AIR 1 Clear and For Fee is displayed at screen 650, insurance costs are displayed to screen 660, tariff charges are displayed at screen 670, and the user may select which carrier to use at screen 680.

Figure 7:
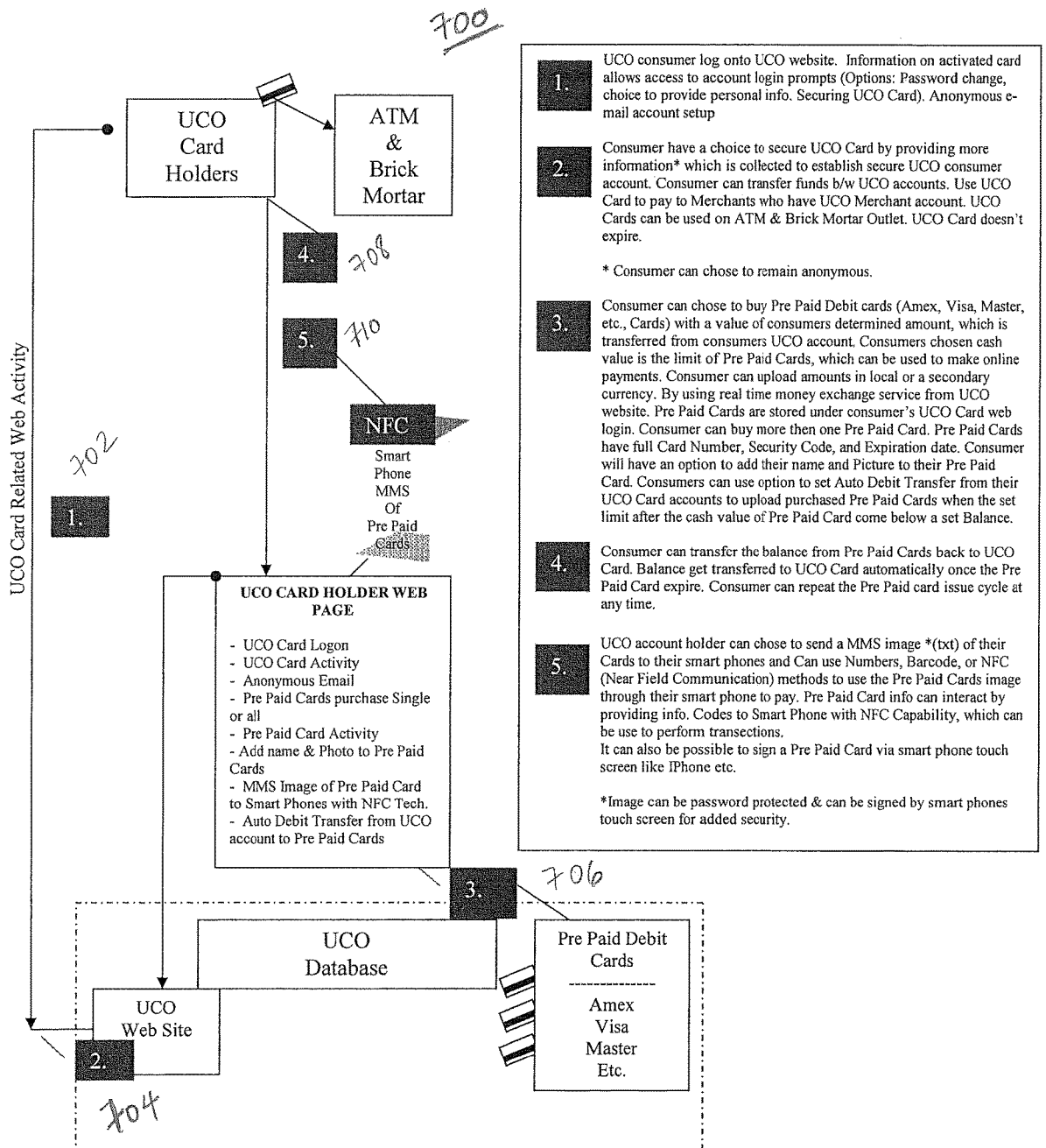
FIG. 7 is a flowchart illustrating a prepaid card process in accordance with an embodiment of the present invention.

FIG. 7 illustrates a prepaid card process 700 in accordance with an embodiment of the present invention. As shown in FIG. 7, the process 700 starts with a Universal Cash consumer logs onto UCO website at operation 702. As set forth herein, it is also possible of the consumer to use a kiosk, ATM and brick & mortar financial institution, etc. Information associated with an activated card allows access to an account by prompting login credentials. The user may also be provided with options such as password change, choice to provide personal information, securing a Universal Cash Card, setting up an anonymous email account, etc.

Subsequent to the Universal Cash card related activity at operation 702, the process 700 continues to accessing the UCO web page at operation 704. At operation 704, the consumer has a choice to secure Universal Cash card by providing more information which is collected to establish secure Universal Cash consumer account. For example, the consumer can transfer funds between Universal Cash accounts, use Universal Cash Card to pay to Merchants who have Universal Cash Merchant account, the Universal Cash Cards can be used on ATM & Brick Mortar Outlet. According to an embodiment, the Universal Cash Card doesn't expire. Moreover, the consumer can chose to remain anonymous.

At operation 706, consumer can chose to buy Pre Paid Debit cards (Amex, Visa, Master, etc.,) with a value of consumers determined amount, which is transferred from consumers Universal Cash account. Consumers' chosen cash value is the limit of Pre Paid Cards, which can be used to make online payments, for example. Consumer can upload amounts in local currency or a secondary currency including by using real time money exchange service from UCO website. Pre Paid Cards are stored under consumer's Universal Cash Card web login. Consumer can buy more than one Pre Paid Card and the Pre Paid Cards may have full Card Number, Security Code, and Expiration date, etc. Consumer will have an option to add their name and Picture to their Pre Paid Card. Consumers can use option to set Auto Debit Transfer from their Universal Cash Card accounts to upload purchased Pre Paid Cards when the set limit after the cash value of Pre Paid Card come below a set Balance.

Subsequent to operation 706, the process 700 goes to operation 708 where the consumer can transfer a balance from Pre Paid Cards back to Universal Cash Card. A balance can be set up to be transferred to Universal Cash Card automatically in the case that the Pre Paid Card expires. The consumer can repeat the Pre Paid card issue cycle at any time.

At operation 710, the Universal Cash account holder can chose to send a MMS image *(txt) of their Cards to their smart phones and Can use Numbers, Barcode, or NFC (Near Field Communication) methods to use the Pre Paid Cards image through their smart phone to pay. Pre Paid Card info can interact by providing info. Codes to Smart Phone with NFC Capability, which can be use to perform transactions. It can also be possible to sign a Pre Paid Card via smart phone touch screen like an iphone, etc. Moreover, an image can be password protected & can be signed by smart phones touch screen for added security.

While particular examples of devices are provided herein, the Universal Card is not limited to use via any particular device and may be used with tablets, iPads, etc., and other similar wireless capable electronic devices.

As shown in FIG. 7, a user may purchase a prepaid card at the ATM and brick mortar or via the UCO web site including using existing protocols such as a credit card (i.e., Amex, Visa, Master, etc). The purchased cards will be of a pre-determined value chosen by the consumer, an amount of which will be transferred from consumer's Universal Cash card balance.

Once the prepaid card is issued, any or all of information related to the prepaid card will be stored under consumers Universal Cash card account on the UCO website and can be registered under the consumer's initial Universal Cash login account. At this point, the consumer will be given full access for usage, upload, reload, withdraw or maintain the Pre Paid Card. The Universal Cash account holder can buy more than one Pre Paid Card.

According to an embodiment, consumers can have different Pre Paid amounts of their choice on each card and can re-load the cards or de-load the cards by transferring the card balance to their Universal Cash card account. Universal Cash account holders can auto upload (preset) any predetermined cash value to be uploaded to any one or all of the issued Pre Paid Cards when and if the cash value of any Pre Paid Cards get below a certain amount the pre determined cash value will be direct debited from Universal Cash Card account and uploaded to the selected Pre Paid Cards.

According to an embodiment, Pre Paid Cards can be uploaded with a local currency or through a second currency by using Real time money exchange service from UCO website money exchange process. The exchanged second currency then can be uploaded to any of their Pre Paid Cards.

Figure 11A:
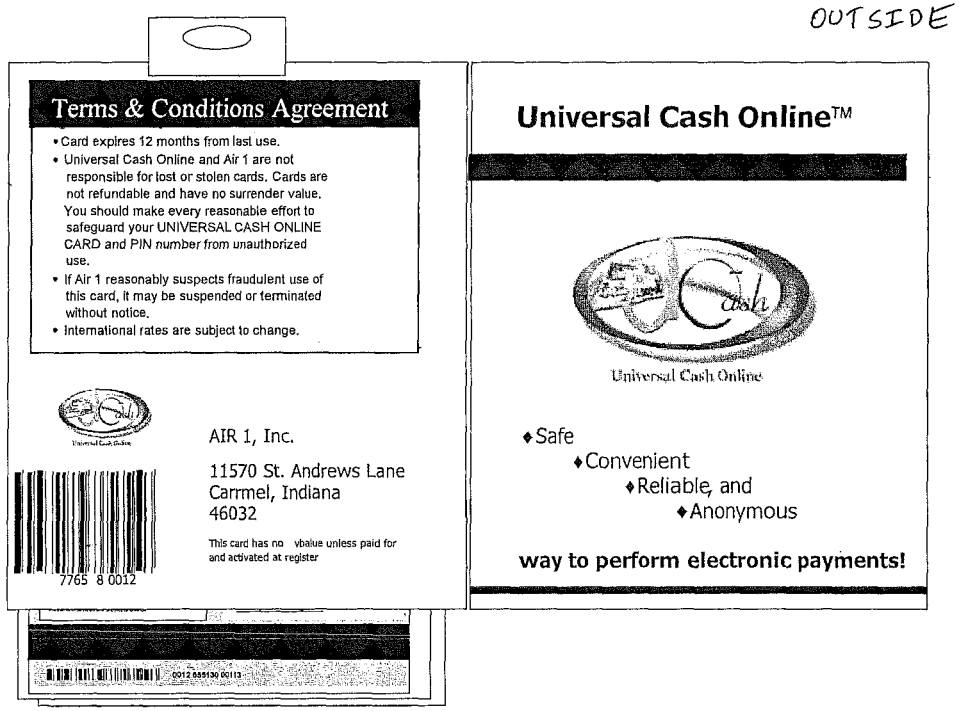
FIGS. 11A and 11B illustrate an exemplary prepaid card in accordance with an embodiment of the present invention.
Figure 11A:
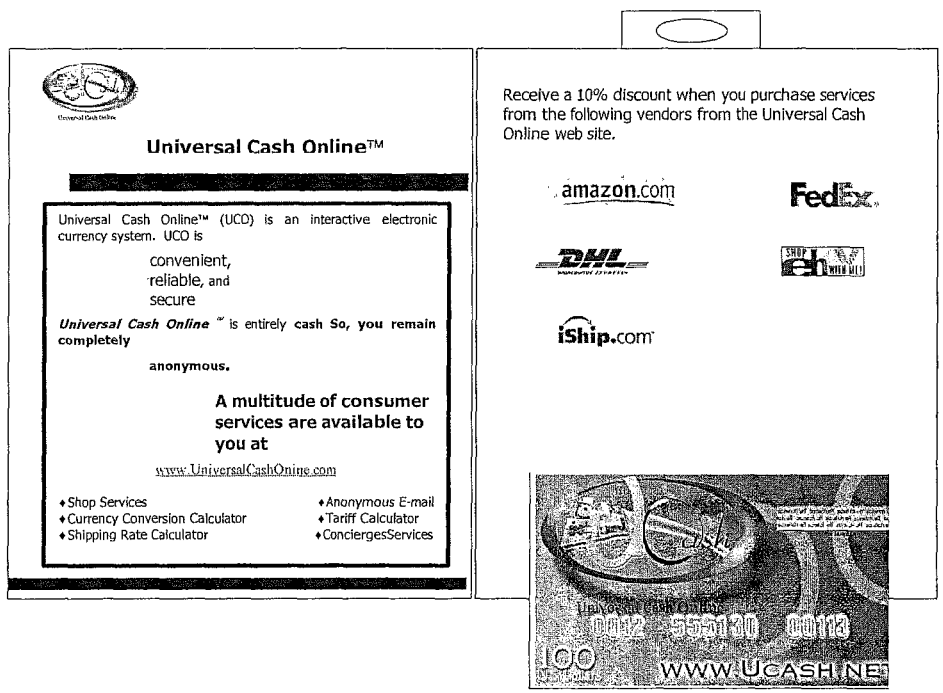
Figure 11B:
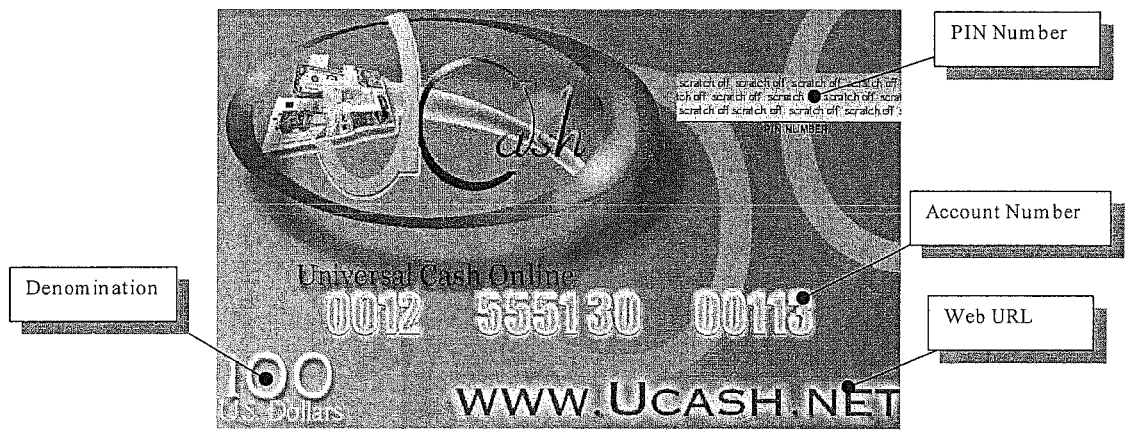
Figure 11B:
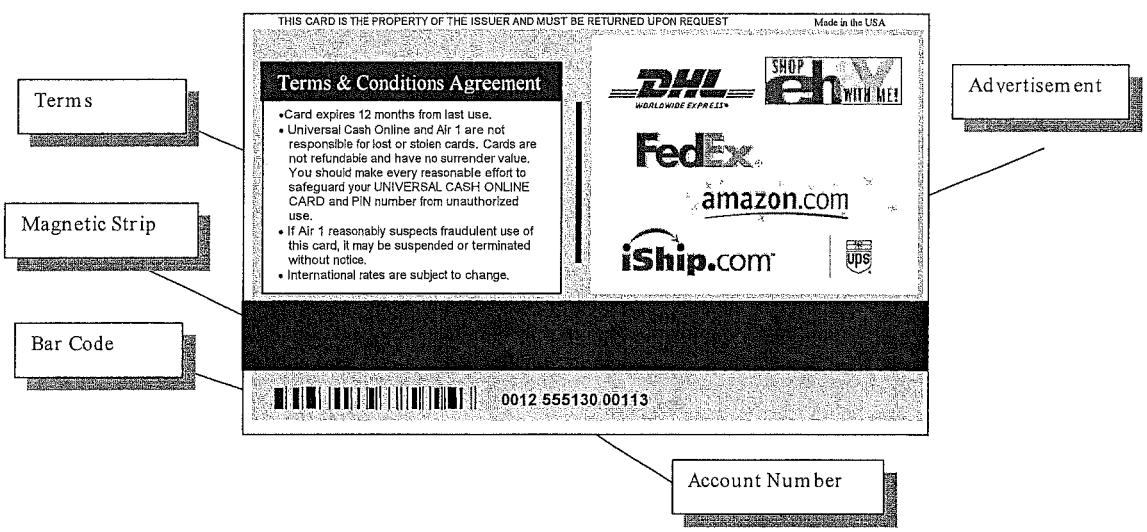

As explained in further detail with FIGS. 11A and 11B, Pre Paid Cards may have a full card number, Security Code, Expiration date and the consumer may be provided with the option of choosing to identifying information (name, picture, etc.) or remain anonymous.

According to an embodiment, the cardholder can renew the card after expiry or cancel the card by transferring the funds back to their Universal Cash Card account. If Pre Paid Card expires and consumers forgot to use it or cancel it or Renew it & if there is any amount left on Pre Paid Card it will automatically be transferred back to Universal Cash card account affiliated with the purchased Pre Paid Card. This prevents consumers to ever losing money and Universal Cash card doesn't expire.

According to an embodiment, certain Pre Paid Cards may only be issued with number and an expiry date and security code for any transactions. Consumers can repeat the initial Pre Paid Card cycle, or consumers can just keep the Universal Cash card active and maintain their balance, which doesn't expire.

As described herein with operation 710, a Universal Cash account holder can chose to send a MMS image (txt) to a smart phone for use with a transaction. According to an embodiment, as illustrated in operation 910 (FIG. 9) Pre Paid Cards' MMS full image (txt) information can interact by providing information code to a smart phone or other devices with NFC Capability, which can be use to perform transactions. According to an embodiment, it is also possible to verify a Pre Paid Card information including using a touch screen. For example, information of a Pre Paid card may be validated via a touch screen of a phone or other smart device.

According to an embodiment, Universal Cash card holders can withdraw cash through ATM or keep their account active by maintaining a balance. Universal Cash Cards can be used in real time to perform online or real world transaction with Merchants having Universal Cash Merchants accounts.

Figure 8:
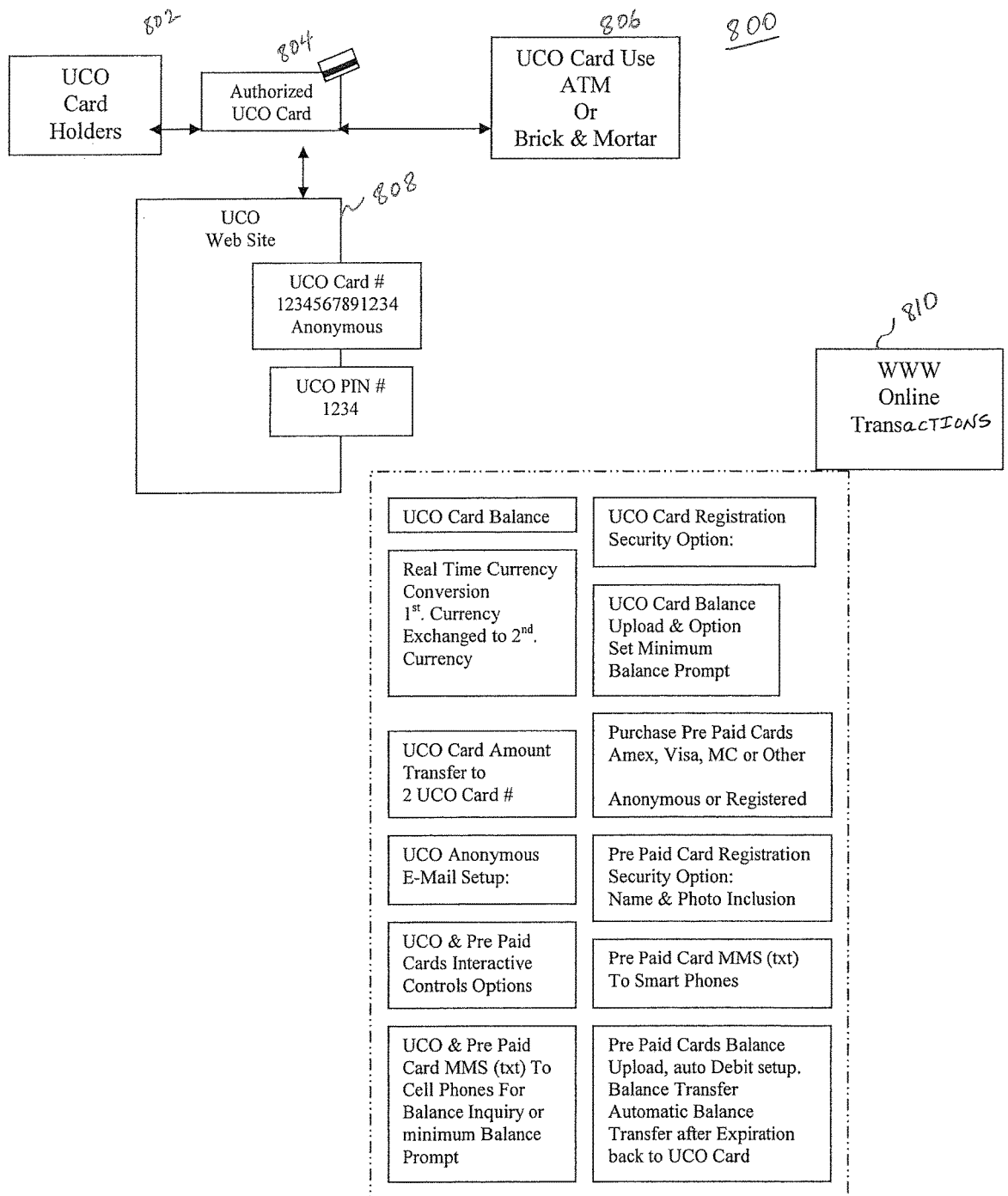
FIG. 8 is a flowchart illustrating an exemplary pre-paid debit card login in accordance with an embodiment of the present invention.

As illustrated with operation 810 in FIG. 8, Universal Cash & Pre Paid Cards Interactive Controls Options are provided. For example, the Interactive Controls Options may include operations to set an amount balance on any or all Universal Cash & Pre Paid Cards by selecting the minimum or maximum amount available limits option, set a usage by age, set a cap on spending limit per day or total available limit, set a usage by Merchant Genre, set txt. Massage to be sent to a cell phone of transactions activity and balances update, set use with their e-valets, set and personalized their cards, set and pay bills (Utility, Telephone etc.), set block card option, set to receive discount offers & coupons, set the access of your full transactions receipts, sign in for rewards points, etc. While particular interactive options are described herein in association with an item of operation 810, the present invention is not limited to providing any particular option.

Figure 9:
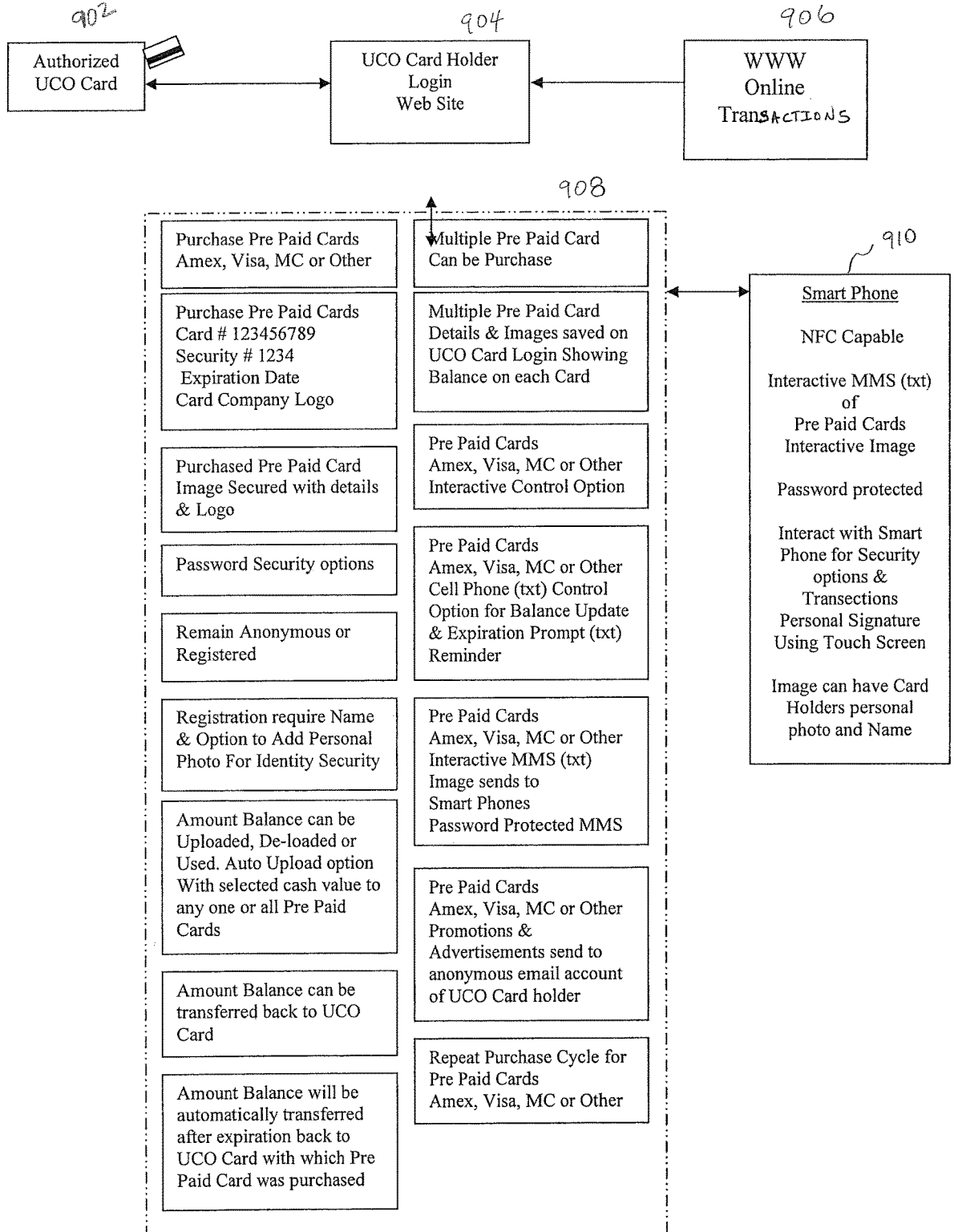
FIG. 9 is a flowchart illustrating a prepaid card process in accordance with an embodiment of the present invention.

For example, transactions provided with operations 810 and 906 in FIGS. 8 and 9, respectively, may be used to track money transfer, setup a wire transfer funds via a bank, set affiliated program to an account e.g.: Facebook™, Hotmail™, msn™, g-mail, etc., set to use with e-wallets, set handicap option e.g. voice activation or Braille mail order cards, set option for saving piggy bank (possibly earning interest), etc.

FIG. 8 is a flowchart illustrating an exemplary pre-paid debit card login process 800 in accordance with the present invention. As shown in FIG. 8, Universal Cash card holders 802 provide information for access. At operation 804, process 800 determines whether the Universal Cash card is authorized. The Universal Cash card may be used as ATM or brick and mortar 806 after determination of whether the Universal Cash card is authorized at operation 804.

For example, to validate the Universal Cash card, the Universal Cash database (FIG. 7) may be queried to determine validity of account number. If the card number matches a number in the Universal Cash database, the card is authorized and validated. After a predetermined number of attempts by the user to get a card validated, a flag may set indicating potential improper or unauthorized action in relation to the account and/or card.

Subsequent to authorization at operation 804, the process 800 proceeds to providing access to the UCO website at operation 808. Various types of information may be utilized to authorize the Universal Cash card and authenticate validity of same. For example, a combination of a Universal Cash card number and a Universal Cash pin number may be utilized. However, while specific example of authorization is provided herein, the present invention is not limited to any particular type of information.

The process 800 may also include online transactions 810 including but not limited to Universal Cash card balance, real time currency conversion, Universal Cash card amount transfer, Universal Cash anonymous email setup, Universal Cash & prepaid cards interactive control options, Universal Cash and prepaid card MMS text to cell phones, Universal Cash card registration, Universal Cash card balance upload and option set minimum, purchase prepaid cards, add name and photo (or other identifying information), prepare card balance upload and auto debit set up, etc. While specific transactions are described in association with transactions 810, the online transactions available are not limited thereto and may include any of the operations described herein.

FIG. 9 is a flowchart illustrating a prepaid card process 900 in accordance with the present invention. As shown in FIG. 9, the prepaid card process 900 includes determination of whether the Universal Cash card is authorized 902 and whether the online transactions 906 should be provided. The process 900 provides the login web site to the Universal Cash card holder at operation 904. At operation 908, various actions may be performed by the Universal Cash card holder including but not limited to purchasing prepaid cards, password security options, anonymous registrations, addition of photo or other personal information, amount balance, transfer to another Universal Cash card, automatic transfer of balance, multiple prepaid card purchase, cell phone control option including text and MMS for balances and other operations, advertisements, etc.

At operation 908, according to an embodiment, the Universal Cash consumer may be provided with an option for disposable PIN(s) and have a choice to select PIN numbers (for example, four PIN numbers) that revolve with usage which will be useful for over the phone purchases (and identity theft/funds transferal), for example. Moreover, options may be made available though an IVR (Interactive Voice Recording) by using telecom technology, for example.

Process 900 also enables use of another device such as a smart phone 910. The phone may have NFC (Near field communication) capability, interactive MMS, password protected, personal signature and image with card holder specific information.

Figure 10:
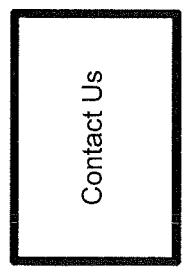
FIG. 10 illustrates components of a user interface in accordance with an embodiment of the present invention.
Figure 10:
Figure 10:
Figure 10:
Figure 10:
Figure 10:

FIG. 10 illustrates components of a user interface accordance with the present invention. As shown in FIG. 10, a user interface of the Universal Cash system may have an option for card related services, browsing services, currency exchange services, shipping services, information about cash, and contact us option. While a few services are described in FIG. 10, according to an embodiment, multitude of services are available. For example, among others, a tariff calculator, a shopping service, a shipping rate calculator, a concierge service, etc. may be provided.

The Universal Cash Online™ not only allows international and domestic consumers the ability to spend cash on the Internet, but it also streamlines the online shopping experience by providing consumers a multitude of services. As shown in FIG. 10, a shopping service may be included as an option to consumers such as shopping by country or location, shopping by language, shopping by merchant, shopping by produce or service, comparison shop search engines, using a Universal Cash shopping cart, etc.

Shipping service such as illustrated in FIG. 10 may allow consumers the ability to shop and ship from one location and the card services provides an option to purchase card online, set card security and privacy, change PIN, card history, etc.

FIG. 10 also illustrates concierges services are provided to assist consumers in meeting their needs including but not limited to merchant discounts and promotions, tariff calculator, currency conversion calculator, merchant validation, vendor location services, help desk, shipping fee calculator, package tracking and also provide links to other services such as clearing and forwarding services, marine shipping insurance, etc.

FIGS. 11A and 11B illustrate an exemplary prepaid card in accordance with the present invention. As shown in FIG. 11A, a prepaid card has an outside part 1100 and an insider part 1102. The prepaid card may be provided with various types of information including terms and conditions, advertisements, use instructions, types of services provides, etc.

FIG. 11B shows the prepaid card with a front part 1104 and a back part 1106. The front part 1104 may include a pin number, account number, an indicator of a denomination and a web URL, for example, while the back part 1106 of the prepaid card may include, terms, magnetic strip, barcode, account number and advertisement. Moreover, according to an embodiment, the Universal Cash cards may be made available (upon request) in braille to facilitate handicapped persons.

As set forth herein, various interactive services may be provided in connection with a card. According to an embodiment, a user may set an authorized amount in association with the card such that only transactions of the authorized amount are performed. As additional levels of security, an authorized site (merchant) may be specified by the user so that only purchases from site is enabled.

According to an embodiment, transaction history associated with a card is maintained in a database such that the user or authorized merchants are able to obtain the transaction history as needed.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic transaction system, comprising:
   a database to store an online electronic bearer information which is generated for a customer, the online electronic bearer information identifying a monetary value, being useable with a proprietary network and a non-proprietary network, and linked with an account identifier issued anonymously to the customer when the online electronic bearer information is generated; and
   by at least one computer hardware,
      transmitting a request to authorize an electronic payment using the online electronic bearer information via at least one of the proprietary network and the non-proprietary network, the request identifying an amount of the monetary value of the online electronic bearer information to be used towards the electronic payment; and
      performing the electronic payment for an electronic transaction upon authorization resulting from a query of the online electronic bearer information stored in the database without requiring a proprietary equipment, wherein the amount of the monetary value of said online electronic bearer information is applied towards the electronic payment and thereby maintains anonymity of the customer while executing the electronic transaction.

2. The electronic transaction system according to claim 1, wherein the online electronic bearer information is sent to a phone or internet-enabled device through the at least one of proprietary network and the non-proprietary network, and the online electronic bearer information is made available within the phone or internet-enabled device for use by the customer accessing the online electronic bearer information through the phone or internet-enabled device to perform the electronic payment for the electronic transaction.

3. The electronic transaction system according to claim 1, wherein the online electronic bearer information is useable in a parallel manner as one of a credit, debit, or prepaid card, and interchange of the monetary value between the customer and a merchant occurs as a transfer in the monetary value in the database which is an internet-based database.

4. The electronic transaction system according to claim 1, wherein the account identifier is an electronic mail account linked to the online electronic bearer information that is issued over the internet for use by the customer when the online electronic bearer information is generated.

5. The electronic transaction system according to claim 1, comprising:
   receiving a selection of an electronic bearer bond payment protocol based on an automatic detection of a need determined for the electronic transaction, a pre-set preference of the customer, or a request from the customer in relation to the online electronic bearer information at a time of the electronic transaction, and
   performing the electronic payment for the electronic transaction via the online electronic bearer information using the electronic bearer bond payment protocol.

6. The electronic transaction system according to claim 1, wherein the online electronic bearer information serves as a universally accepted payment form a level of anonymity identical as one of a real world cash transaction independent of identity of the customer or a recipient.

7. The electronic transaction system according to claim 1, wherein transaction history data involving the online electronic bearer information including one or more of creation, deletion, changes in ownership, non-payment/non-purchase transfers, payment/purchase, refund, deposit, debit, credit, permission alteration, linking with other parties, setting up of automatic deductions is provided to the customer.

8. The electronic transaction system according to claim 1, wherein the online electronic bearer information is provided to the customer using one of a Multimedia Messaging Service (MMS), a barcode, and a NFC (Near Field Communication) which is useable by the customer to conduct the electronic transaction by presenting the online electronic bearer information to a merchant.

9. An online electronic bearer information account transaction system, comprising:
 a computer hardware communicatively coupled to a network, the computer being configured to maintain anonymity of an account, an electronic transaction, and an electronic interaction involving a user;
 a database configured to store an online electronic bearer information which is generated for the user, the online electronic bearer information identifying a monetary value and reflecting information of the monetary value to be used towards an electronic payment for the electronic interaction involving the user, the online electronic bearer information being useable with a proprietary network and a non-proprietary network, and linked with an account identifier issued anonymously to the user when the online electronic bearer information is generated; and
 wherein the computer hardware is configured to:
  process a request to authorize the electronic payment using the online electronic bearer information via at least one of the proprietary network and the non-proprietary network, the request identifying an amount of the monetary value of the online electronic bearer information to be used towards the electronic payment,
  execute the electronic payment for the electronic transaction upon authorization resulting from a query of the online electronic bearer information stored in the database without requiring a proprietary equipment, wherein the amount of the monetary value of the online electronic bearer information is applied towards the electronic payment to thereby maintain anonymity of at least one of the electronic account, the electronic transaction and the interaction of the user.

10. A non-transitory computer readable medium having stored therein a program to cause a computer to execute an electronic transaction, comprising:
 storing, in a database, an online electronic bearer information which is generated for a customer, the online electronic bearer information identifying a monetary value, being useable with a proprietary network and a non-proprietary network, and linked with an account identifier issued anonymously to the customer when the online electronic bearer information is generate
 providing the online electronic bearer information in response to a request to authorize an electronic payment using the online electronic bearer information via at least one of the proprietary network and the non-proprietary network, the request identifying an amount of a monetary value that is stored to be used towards the electronic payment; and
 performing, by a computer hardware, the electronic payment for the electronic transaction upon authorization resulting from a query of the online electronic bearer information stored in the database without requiring a proprietary equipment, wherein the amount of the monetary value of the online electronic bearer information is towards the electronic payment and thereby maintains anonymity of the customer while executing the electronic transaction.

11. The non-transitory computer readable medium according to claim 10, wherein an account number and a PIN associated with the online electronic bearer information is required for the electronic transaction while the customer remains anonymous and selects a payment protocol.

12. The non-transitory computer readable medium according to claim 11, wherein an image, generated by the computer hardware from data of the online electronic bearer information, containing the online electronic bearer information is sent to a phone or internet-enabled device, and
 the online electronic bearer information made available within the phone/internet-enabled device is used, by the phone or internet-enabled device or the customer accessing the online electronic bearer information through the phone or internet-enabled device, to perform the electronic payment for the electronic transaction with the payment protocol selected by the customer on the phone or internet-enabled device.

13. The non-transitory computer readable medium according to claim 10, wherein the electronic payment for the electronic transaction using the online electronic bearer information is provided using an existing protocol acceptable by a merchant, while maintaining anonymity of the online electronic bearer information and the customer.

14. The non-transitory computer readable medium according to claim 10, wherein the performing of the electronic payment for the electronic transaction includes obtaining the online electronic bearer information which reflects a current monetary value from the database and applying the current monetary value to another online electronic bearer information in another database, or an external financial account.

15. The non-transitory computer-implemented method according to claim 1, wherein the online electronic bearer information is represented as a dynamic interactive electronic image generated from the database that is updated in real time and is accessible on a phone or internet-enabled device, and exchanged through networks.

16. The non-transitory computer readable medium according to claim 11, wherein at least one of the account number and the PIN associated with the online electronic bearer information is provided for the electronic transaction using an Interactive Voice Recording (IVR), while maintaining anonymity of the online electronic bearer information and the customer.

* * * * *